United States Patent
League

(10) Patent No.: US 10,346,446 B2
(45) Date of Patent: Jul. 9, 2019

(54) SYSTEM AND METHOD FOR AGGREGATING MULTI-SOURCE DATA AND IDENTIFYING GEOGRAPHIC AREAS FOR DATA ACQUISITION

(71) Applicant: MDA Information Systems LLC, Gaithersburg, MD (US)

(72) Inventor: Alfred W League, Gaithersburg, MD (US)

(73) Assignee: Radiant Geospatial Solutions LLC, Herndon, VA (US)

( * ) Notice: Subject to any disclaimer, the term of this patent is extended or adjusted under 35 U.S.C. 154(b) by 224 days.

(21) Appl. No.: 15/341,338

(22) Filed: Nov. 2, 2016

(65) Prior Publication Data

US 2017/0124116 A1 May 4, 2017

Related U.S. Application Data

(60) Provisional application No. 62/249,584, filed on Nov. 2, 2015.

(51) Int. Cl.
*G06F 16/00* (2019.01)
*G06F 16/29* (2019.01)
(Continued)

(52) U.S. Cl.
CPC ........... *G06F 16/29* (2019.01); *B64G 1/1021* (2013.01); *G06F 16/245* (2019.01); *H04L 51/20* (2013.01); *H04L 51/32* (2013.01); *H04W 4/12* (2013.01)

(58) Field of Classification Search
CPC ......... G06F 17/30241; G06F 17/30424; G06F 17/30; G06F 16/29; G06F 16/245;
(Continued)

(56) References Cited

U.S. PATENT DOCUMENTS 7,103,609 B2 9/2006 Elder et al.
7,308,449 B2 12/2007 Fairweather
(Continued)

OTHER PUBLICATIONS

Adler, Nicole, Lea Friedman, and Zilla Sinuany-Stern. "Review of Ranking Methods in the Data Envelopment Analysis Context." European Journal of Operational Research 140.2 (2002): 249-65. Web.
(Continued)

*Primary Examiner* — Anh Ly
(74) *Attorney, Agent, or Firm* — Endurance Law Group PLC

(57) ABSTRACT

Disclosed is a system and method for collecting, processing and aggregating satellite imagery with large volumes of other digitized data for analysis by a human user in order to identify geographic areas for further data collection and/or analysis. More particularly, the invention relates to identifying geographic subjects for satellite image acquisition by aggregating and analyzing first-time changes detected by satellite imagery as well as weather report data, social media streams and newswire feeds. An analytics engine uses rules to qualify, flag and correlate asynchronous data from a plurality of sources with changes on the earth's surface, and catalogs and stores the qualified and correlated data where it may be queried and used to prepare reports or recommendations for future satellite image acquisition targets.

19 Claims, 4 Drawing Sheets

(51) Int. Cl.
*H04W 4/12* (2009.01)
*H04L 12/58* (2006.01)
*B64G 1/10* (2006.01)
*G06F 16/245* (2019.01)

(58) Field of Classification Search
CPC .......... G06F 16/00; H04W 4/12; H04L 51/20; H04L 51/32; H04L 12/58; B64G 1/1021; B64G 1/10; G06K 9/0063; G01W 1/10
See application file for complete search history.

(56) References Cited

U.S. PATENT DOCUMENTS

| | | | |
|---|---|---|---|
| 7,533,069 B2 | 5/2009 | Fairweather | |
| 7,581,166 B2 | 8/2009 | Renger et al. | |
| 7,685,083 B2 | 3/2010 | Fairweather | |
| 7,725,565 B2 | 5/2010 | Li et al. | |
| 7,873,673 B2 | 1/2011 | Cleveland et al. | |
| 7,953,842 B2 | 5/2011 | Dillon et al. | |
| 8,266,148 B2 | 9/2012 | Guha et al. | |
| 8,379,913 B1* | 2/2013 | Robinson | G06K 9/6254 382/100 |
| 8,468,244 B2 | 6/2013 | Redlich et al. | |
| 8,583,686 B2 | 11/2013 | McGregor | |
| 9,015,301 B2 | 4/2015 | Redlich et al. | |
| 9,229,977 B2 | 1/2016 | Chadha et al. | |
| 2003/0074471 A1* | 4/2003 | Anderson | H04L 29/12009 709/245 |
| 2003/0172053 A1 | 9/2003 | Fairweather | |
| 2008/0125912 A1* | 5/2008 | Heilman | D06F 39/005 700/275 |
| 2009/0089078 A1* | 4/2009 | Bursey | H04W 4/70 705/300 |
| 2009/0115779 A1* | 5/2009 | Shulman | G01B 11/2513 345/419 |
| 2009/0216747 A1 | 8/2009 | Li et al. | |
| 2009/0270166 A1* | 10/2009 | Thukral | G06F 17/30038 463/25 |
| 2010/0131303 A1* | 5/2010 | Collopy | G06Q 30/0224 705/4 |
| 2010/0183034 A1* | 7/2010 | Kroepfl | H04L 67/1095 370/503 |
| 2010/0223276 A1* | 9/2010 | Al-Shameri | G06F 17/30333 707/769 |
| 2011/0258049 A1* | 10/2011 | Ramer | G06Q 30/02 705/14.66 |
| 2012/0190386 A1* | 7/2012 | Anderson | G01C 15/04 455/456.3 |
| 2012/0197896 A1 | 8/2012 | Li et al. | |
| 2013/0325787 A1 | 12/2013 | Gerken et al. | |
| 2014/0040282 A1* | 2/2014 | Mann | G06Q 10/06314 707/748 |
| 2014/0358926 A1 | 12/2014 | McGregor et al. | |
| 2015/0193482 A1 | 7/2015 | Kaushansky et al. | |
| 2015/0199410 A1 | 7/2015 | Redlich et al. | |
| 2015/0294422 A1* | 10/2015 | Carver | G06Q 40/08 705/4 |
| 2016/0078273 A1* | 3/2016 | Hamid | G06K 9/00637 382/103 |
| 2017/0124116 A1* | 5/2017 | League | G06F 17/30241 707/769 |

OTHER PUBLICATIONS

Auer, Sören, Christian Bizer, Georgi Kobilarov, Jens Lehmann, Richard Cyganiak, and Zachary Ives. "DBpedia: A Nucleus for a Web of Open Data." The Semantic Web Lecture Notes in Computer Science (2007): 722-35. Web.
Chaiken, Ronnie, Bob Jenkins, Per-Åke Larson, Bill Ramsey, Darren Shakib, Simon Weaver, and Jingren Zhou. "Scope: Easy and Efficient Parallel Processing of Massive Data Sets." Proc. VLDB Endow. Proceedings of the VLDB Endowment 1.2 (2008): 1265-276. Web.
Dork, M., S. Carpendale, C. Collins, and C. Williamson. "VisGets: Coordinated Visualizations for Web-based Information Exploration and Discovery." IEEE Trans. Visual. Comput. Graphics IEEE Transactions on Visualization and Computer Graphics 14.6 (2008): 1205-212. Web.
Han, Jiawei, and Micheline Kamber. "Chapter 6." Data Mining: Concepts and Techniques. Urbana: Morgan Kaufmann, 2006. N. pag. Print. http://hanj.cs.illinois.edu/bk3/.
Jagadish, H. V., Johannes Gehrke, Alexandros Labrinidis, Yannis Papakonstantinou, Jignesh M. Patel, Raghu Ramakrishnan, and Cyrus Shahabi. "Big Data and Its Technical Challenges." Communications of the ACM Commun. ACM 57.7 (2014): 86-94. Web.
Lorenzo, Giusy Di, Hakim Hacid, Hye-Young Paik, and Boualem Benatallah. "Data Integration in Mashups." ACM SIGMOD Record SIGMOD Rec. 38.1 (2009): 59. Web.
Yang, Limin, Chengquan Huang, Collin G. Homer, Bruce K. Wylie, and Michael J. Coan. "An Approach for Mapping Large-area Impervious Surfaces: Synergistic Use of Landsat-7 ETM and High Spatial Resolution Imagery." Canadian Journal of Remote Sensing 29.2 (2003): 230-40. Web.

* cited by examiner

FIG. 4
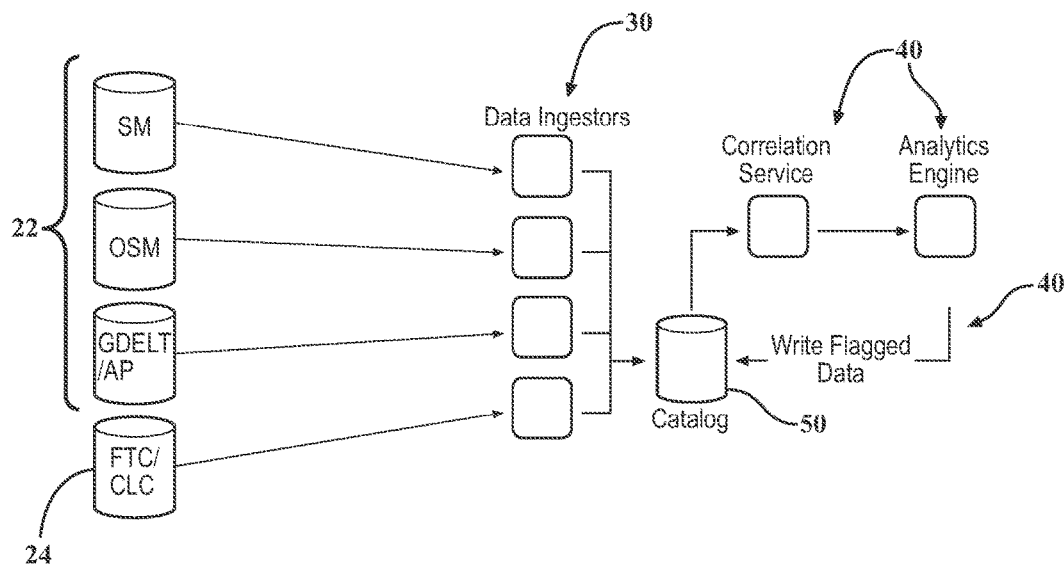
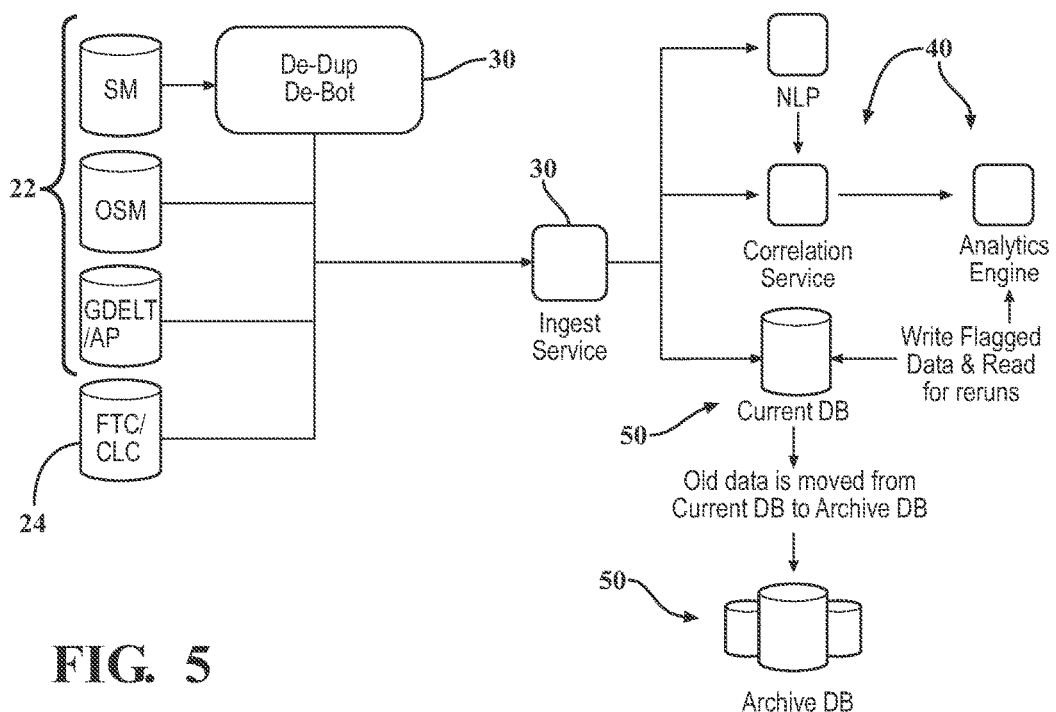
FIG. 5

SYSTEM AND METHOD FOR AGGREGATING MULTI-SOURCE DATA AND IDENTIFYING GEOGRAPHIC AREAS FOR DATA ACQUISITION

This application claims priority to Provisional Patent Application No. 62/249,584 filed Nov. 2, 2015, the entire disclosure of which is hereby incorporated by reference and relied upon.

BACKGROUND OF THE INVENTION

Field of the Invention

The invention relates generally to collecting and processing satellite imagery aggregated with large volumes of other digitized data for analysis by a human user in order to identify geographic areas for further data collection and/or analysis. More particularly, the invention relates to identifying geographic subjects for satellite image acquisition by aggregating and analyzing first-time changes detected by satellite imagery as well as weather report data, social media streams and newswire feeds. The data is filtered to identify potentially relevant data by use of rules, then cataloged and stored in a data warehouse where it may be queried or used to prepare a report for a user useful for directing satellite image acquisition.

Description of Related Art

Commercial and governmental enterprises may be interested in collecting, aggregating, and analyzing the enormous amounts of information available from multiple sources. Governmental intelligence agencies especially may desire information on certain regions of interest. These sources may be proprietary to the enterprise, public, or quasi-public. For example, historical and substantially contemporaneous satellite imagery is available, weather data is widely available, and as the internet has grown an enormous amount of information is available from companies which participate in the "social media" arena. The growth of the internet, and the millions of personal devices connected to it, make it virtually impossible for any person to aggregate and analyze the torrent of information generated daily. This problem may be especially acute for national intelligence agencies, which have limited resources available to harvest, compile, and distill data, including the vast quantity of third party data on social media (e.g. Facebook, Twitter, Instagram, etc.), and may desire to promptly redirect intelligence collection and/or analysis, more particularly redirecting satellite image acquisition targets to areas where new images are most likely to yield useful information.

Enterprises currently have available to them some helpful tools. For example, MDA Information Systems, LLC has developed systems that use satellite imagery to identify and track geophysical developments, known as the MDA "Refined Persistent-change Model" (RPM), substantial portions of which are disclosed in U.S. Pat. No. 8,548,248 "Correlated Land Change System and Method" (CLC), which disclosure is hereby incorporated in its entirety. More particularly, that CLC patent discloses a system and method for identifying and confirming a "persistent feature change" based on a plurality of satellite images. Identifying confirmed persistent feature changes, particularly first time changes, are an invaluable source of intelligence. This system is available commercially from MDA Information Systems, LLC as "Persistent Change Monitoring" marketed as PCM®.

Another source of information is weather conditions. Weather conditions may be compared with new remotely detected alterations on the earth's surface (identified by satellite, for example) to help determine whether a change feature is the result of a natural weather event, such as snow, flood or drought. Data relating to weather information is available from a variety of government and private sources, including from MDA Information Systems, LLC through its Weather Desk platform.

A large source of information is asynchronous data that may be open source or available for purchase. "Open source" data is data that is available for acquisition at no or minimal charge from public or private sources, such as the geographical mapping program Open Street Maps (www.openstreetmap.org). "Asynchronous data" commonly means data or a data process that is generated or operates independently of controlled processes. Examples of asynchronous data include newswire feeds, social media visible including metadata (e.g. Twitter, Facebook, Instagram, YouTube), text messages, Open Street Maps data, weather data, and earthquake data.

The problems with analyzing asynchronous data—especially social media—are its volume, variety, velocity, veracity. It is possible to hire and train analysts to extract essential information from open sources, but it is expensive, and the ever-growing volume of traffic precludes analysis and distillation of all but a tiny fraction of available information.

Some tools to monitor social media have also been introduced, such as the MDA products Open and All Source Intelligence Service (OASIS) and Geotagged Open Street Search Intelligence Profiler (GOSSIP). These products harvest geo-tagged social media from U.S. and international sources relating to thousands of features people, places, events, and equipment. But users must manually correlate information harvested from social media with other data sources, such as satellite imagery, news stories, and weather reports. The volume and scope of the required manual analysis effectively precludes timely aggregation and processing of changing imagery from satellites news and weather reports, on-ground photographs, and social media activity. Such information has never been harvested, processed, and aggregated using geospatial and temporal criteria automatically, in near-real-time, using criteria that the system or a user can automatically modify in response to near-real-time observed activity.

What is needed is a system and method to improve analyst and intelligence asset efficiency through harvesting, compiling, and distilling open source data according to self-generated and/or user-specified criteria to qualify the data that is most likely to be relevant to directing further intelligence collection and analysis, and more particularly useful for directing satellites to acquire images of geographic areas having higher probability of yielding useful intelligence information. The system would harvest a vast amount of open source data, seek out anomalies or changes, review and correlate developments and anomalies, compile the essential information, and provide analysts with tipoffs/cues for further investigations. By pre-processing aggregated data, the system will allow more in-depth analysis, increase areal coverage, and incorporate relevant, essential information from the explosion of new open source data. The objective would be for the system to provide only the essential, qualified open source-derived information to the enterprise as analyst-ready information with geospatial content, facilitating the direction of intelligence assets and more particularly gathering valuable satellite imagery.

BRIEF SUMMARY OF THE INVENTION

Disclosed is a system and method for identifying geographic areas as favorable candidates for future efforts to acquire intelligence information, and more particularly for targeted satellite imagery acquisition. The method comprises assembling information from a plurality of sources, including satellite imagery, weather conditions data, and asynchronous sources such as newswire services and social media. The method includes detecting a persistent first time change (FTC) at a geographic location by comparing two or more satellite images of the geographic location at two or more points in time, defining a geographic boundary of the FTC, marking as an "FTC event" if the geographically bounded FTC exceeds an area threshold, collecting asynchronous data from a plurality of data sources with each data source comprising a plurality of geotagged and timestamped asynchronous data packets (ADPs) wherein the ADPs comprise social media postings, weather conditions at a weather location, newswire stories, and Open Street Maps (OSM) maps, qualifying an ADP by assessing that ADP for reliability and authenticity, designating one or more qualified ADPs as an "asynchronous data event, correlating the FTC event and the one or more qualified asynchronous data events, predicting a geographic progression of the correlated events, and identifying a target geographic location for future satellite imagery acquisition based on the predicted geographic progression. The overall system to aggregate and process data from multiple sources to produce analyst-ready information for targeting of intelligence acquisition may be generally referred to herein as MARI.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 4 is a first embodiment of an aspect of the invention relating to ingesting, processing, cataloging and storing asynchronous data.

FIG. 5 is a second embodiment of an aspect of the invention relating to ingesting, processing, cataloging and storing asynchronous data.

DETAILED DESCRIPTION OF THE INVENTION

Figure 1:
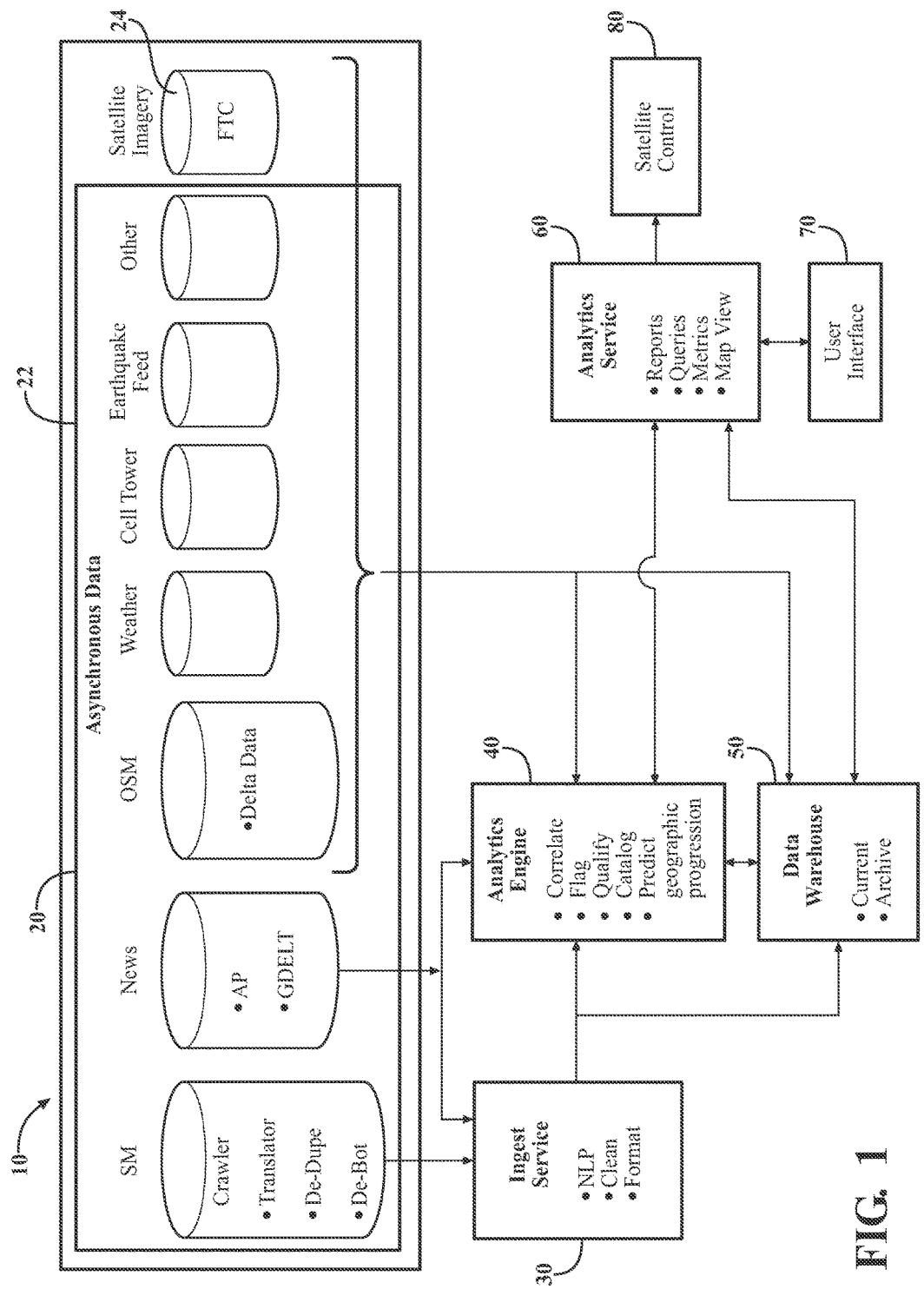
FIG. 1 is an embodiment of a MARI system for identifying geographic areas as favorable candidates for future satellite imagery acquisition.

Referring to the figures, wherein like numerals indicate like or corresponding parts throughout the several views, FIG. 1 shows MARI system 10 comprising a plurality of data sources 20. The data sources in turn are comprised of one or more asynchronous sources 22 and satellite imagery source 24. An ingest service 30 receives raw data from one or more data sources 20 for pre-processing. Analytics engine 40 receives raw data from one or more of data sources 20 and from ingest service 30. Analytics engine is in communication with data warehouse 50 and analyst service 60. Analyst service 60 communicates with a user interface 70 and satellite control 80.

As disclosed in U.S. Pat. No. 8,548,248 "Correlated Land Change System and Method" (CLC patent) which is incorporated in its entirety, satellite imagery source 24 provides satellite images of earth. Typically, satellite imagery source 24 produces a plurality of photographs of a given area. The photographs may originate from one or more satellites, and may be substantially contemporaneous or be temporally separated by hours, weeks, months or years. Satellite imagery source 24 produces an image of a first geographic area of earth at a first point in time and a second satellite image of the first geographic area at a second point in time. Using the techniques disclosed in the CLC patent, including a change detection module, at least one satellite image is compared with at least one other temporally separated satellite image and a persistent change feature is detected at the first geographic area. The persistent change feature may be a recurrence of a change observed on one or more earlier occasions (e.g. ice on a lake), or may be a first time change (FTC) that has not been observed earlier (e.g. excavation activity suggesting construction or mining). A satellite image may be divisible into individual polygon cells, and any given satellite scene may be comprised of about 10,000-20,000 such polygon cells. A virtual boundary can be defined around the geographic area of the FTC. The FTC boundary can be any shape, including closed polygons as disclosed in the CLC patent FIG. 5b.

The size of the area affected by a FTC event may be significant. Generally, the larger the size of an area affected, the more likely the FTC will have significance for purposes of collecting potentially relevant information. For example, detecting a FTC comprised of an individual motor vehicle located in previously unoccupied area will rarely yield useful intelligence. Detecting a several dozen military vehicles assembled in a farmer's field, however, could be relevant information. The system may therefore include a step for calculating the size of one or more FTC polygons, and marking as an "FTC event" if the geographically bounded FTC exceeds an area threshold. FTC events that satisfy a minimum-size geographic area constraint, e.g. 200 square meters, may then be forwarded for further analysis. The system and method may also include marking the geographic centerpoint of the FTC polygons. The system and method may also include timestamping FTC events.

Asynchronous data sources 22 may comprise one or more publicly available sources of data, such as a newswire service, Open Street Maps (OSM), weather data, messaging texts, cell tower usage data, an earthquake feed, and/or social media platforms. The newswire service may be the Associated Press and/or GDELT. Weather data could be a public government source such as the U.S. National Weather Service, or a private source such as Weather Desk available from MDA Information Systems, LLC. The earthquake feed could be the feed available from the U.S. Geological Survey. The social media platforms could comprise, for example, Facebook, Twitter, YouTube, Instagram, Tumblr, Pinterest, Picasa, Four Square, Flickr, and WikiMapia. Asynchronous data 22 could also comprise social media platforms more popular in foreign countries such as Vkontakte, VK, VK Photo, Sina Webio, Cloob, Tencent Qzone, Tencent Weibo, Locr, Panaramio, Tencent Maps, Jiepang Checkins, or Jiepang Places. Social media could also comprise website-based content in addition to the social media described above, such as websites maintained by governmental agencies and political and quasi-political parties.

OSM data is routinely updated by contributors to that open source mapping collaboration. In one embodiment, the OSM data may comprise a base set of OSM maps and updated OSM maps. The base set of OSM maps may be compared against the updated OSM maps to identify changes and to produce an OSM delta dataset. The OSM delta dataset can assist in identifying or confirming changes in geographical features. One can periodically repeat the comparison step by comparing the latest update of OSM maps against the version most recently compared, then producing a new OSM delta dataset. Updating the system's OSM delta dataset may occur at any interval deemed desirable, e.g. daily or weekly or irregularly on demand.

Asynchronous data 22 is produced as substantially continual streams of stories, updates, texts, posts, photos, videos and messages. Each individual story, text, weather report, posting, etc. within a respective stream is an asynchronous data "packet" (ADP). Each ADP may comprise a time stamp and/or geotag (e.g. cell phone location at the time of photo or video, location of the device or computer via internet server ID or other origin identification means). Geographical information is inherently contained within weather conditions, the FTC satellite data and the OSM delta dataset.

The asynchronous data sources 22 may further comprise weather conditions for a plurality of geographic locations. Weather conditions at a given calendar date and location may be averaged. Atypical weather conditions may be flagged by the system. For example, the system can flag weather conditions that deviate a user-defined number of standard deviations from the historical mean for any geographic location, such as temperature, precipitation, or wind conditions that fall 2, 3, or 4 standard deviations from the historical mean.

The asynchronous data sources 22 may further comprise mobile text messages and social media postings which may have associated metadata including the sender's geographic location (geotagging) and time of transmission. Social media postings and text messages may also be transmitted via mobile device transmitted via at least one cell tower. Cell towers in close proximity to a sudden adverse event may experience high traffic volumes that deviate significantly from the historical mean. Data usage patterns for a cell tower or towers may be available for usage analysis.

Asynchronous data sources 22 may further comprise a feed of regional or global seismic activity, capable of detecting earthquakes, tremors, or significant disturbances such as explosions. RSS data feeds of seismic activity are available from several sources for example, USArray, IRIS, and the U.S. Geological Survey. Atypical seismic activity may be flagged by the MARI system, e.g., seismic activity above 5.0 on the Richter magnitude scale generally, or above 4.0 on the Richter magnitude scale within a certain geographic area of interest (e.g. to detect bomb detonations in Ukraine). Asynchronous data sources may also comprise any number of other observable conditions or reported information. For example, ground-based or satellite-based monitoring data, such as radioactivity, normalized density vegetation index readings, or air pollution levels.

The above-described sources of asynchronous data 22 are exemplary rather than limiting in nature. Variations and modifications to the disclosed embodiment—especially in light of rapidly evolving world of internet-connected devices and processes—may become apparent to those skilled in the art and fall within the scope of the invention.

Figure 2:
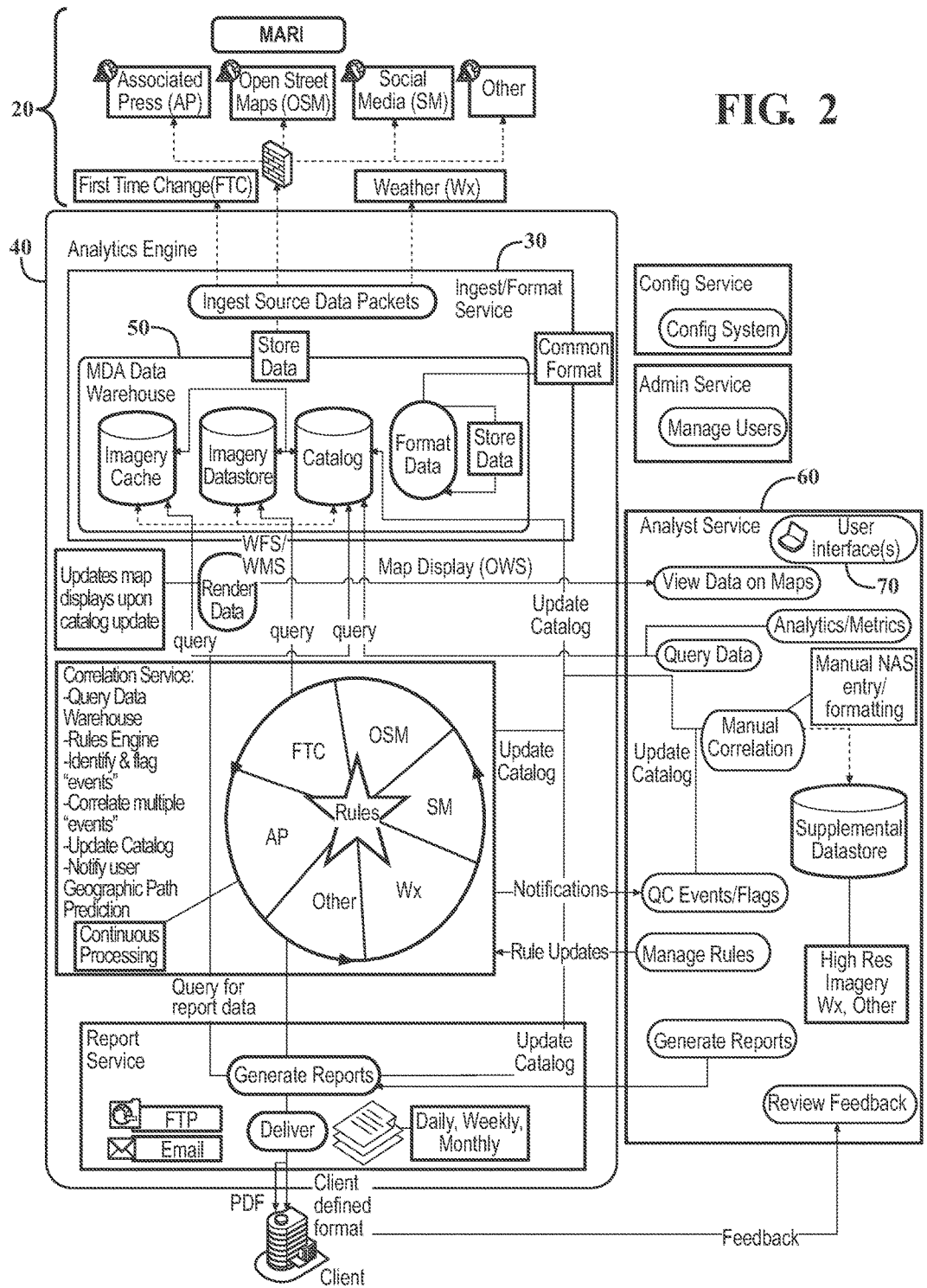
FIG. 2 is a first embodiment of a MARI system for identifying, querying and reporting geographic areas and nongeographic features to a user for human analysis.

Social media and internet website data may be collected by a web crawler using methods and products well known in the art. The crawled data and newswire services may contain duplicates (e.g. "retweets," duplicate news stories, etc.) and content produced by "robot" software (e.g. advertisements or comments associated with social media postings). Moreover, a substantial percentage of asynchronous data packets may be received in a language other than English. As shown in FIG. 1 and FIG. 2, the system may comprise an ingest service 30 to pre-process data. Ingest service 30 may comprise an internet based service, and optionally may comprise real time streaming data into the cloud. In one embodiment, the ingest service comprises Kinesis by Amazon Web Services, and may optionally comprise Kinesis Firehose. Ingest service 30 may clean, i.e. remove, duplicate ADPs ("de-dupe") and remove robot-generated postings/stories/ADPs ("de-bot"). Ingest service 30 may also translate ADPs received in a foreign language into a desired common language such as English. As shown in FIG. 1, ingest Service 30 may also comprise a natural language processor (NLP) software to extract information such as entities, activities, and relationships from unstructured ADP content. In another embodiment shown in FIG. 5, the NLP software operates on data after pre-processing by ingest service 30. In one embodiment, the NLP software comprises Ordenite available from Edgetide LLC, Hanover, Md. In another embodiment, the de-dupe and de-bot processes, and optionally the translation process, may occur in near real-time as the asynchronous data is collected independent of ingest service 30. In another embodiment, the ingest service assigns a unique identifier to each ingested ADP. In another embodiment, ingest service 30 renders diverse ADPs into a common format which may facilitate analytical processes by an analytics engine described below.

As discussed above, a human cannot process more than a small fraction of the information produced by the asynchronous data sources 22. As shown in FIG. 1, an analytics engine 40 receives data from asynchronous data sources 22 and/or ingest service 30 and/or satellite imagery source 24. FIGS. 2-5 depict other embodiments of the system relating to ingesting and processing asynchronous data 22. As shown in the figures, the analytics engine may perform a variety of functions.

A first function performed by analytics engine 40 is to "qualify" an ADP—especially a social media ADP—as worthy of further consideration and analysis. Qualifying an ADP may comprise assessing the source of an ADP against historical records for the source's reliability and accuracy. Analytics engine 40 may rate an ADP's reliability, e.g. as "qualified" "unknown" or "not qualified." Optionally, reliability may be rated on a scale, e.g. from 1 to 10.

Another function performed by analytics engine 40 is to flag an ADP based on prescribed rules, such as whether the content of that ADP's correlates with an FTC event and/or with one or more contemporaneous ADPs pertaining to an area, person, topic, or feature of interest. In one embodiment, analytics engine 40 flags one or more ADPs based on their geographic correlationship with a FTC event arising from analysis of satellite imagery 24. Analytics engine may utilize the geographic centerpoint marked for the FTC event to establish the geographic correlation. Analytics engine 40 may also operate under rules that flag an unusual number of contemporaneous social media postings, such as many hospital admissions within a certain geographic area. In one embodiment, flagged ADPs are correlated with one or more ADPs to generate a new asynchronous data "event," e.g. "November 2, 2016 Crimea hostilities." In another embodiment, an ADP may be flagged as relating to a historical qualified ADP, or to a historical asynchronous data event. Analyst engine 40 may further comprise correlating asynchronous data events with historical data residing in an archive database. Analytics engine 40 may correlate ADPs, asynchronous data events, FTC events, historical events, persons of interest, areas of interest, and features of interest—singly, in pluralities, or in any combination.

Analytics engine 40 may be provided by a third party computing service, such as Amazon Web Services or LUX analytical services. Analytics engine 40 may be a scalable enterprise operating system to expand computer processing capacity. In one embodiment, the computing capacity of analytics engine 40 is elastically controlled, for example by throttling the rate of data ingested, or throttling the processing bandwidth/capacity of the engine. The third party internet computing service may comprise Amazon Elastic Compute Cloud. In another embodiment, analytics engine 40 may comprise Redhat open source software for enterprise systems. In another embodiment, the software system may employ the Linux operating system.

Figure 3:
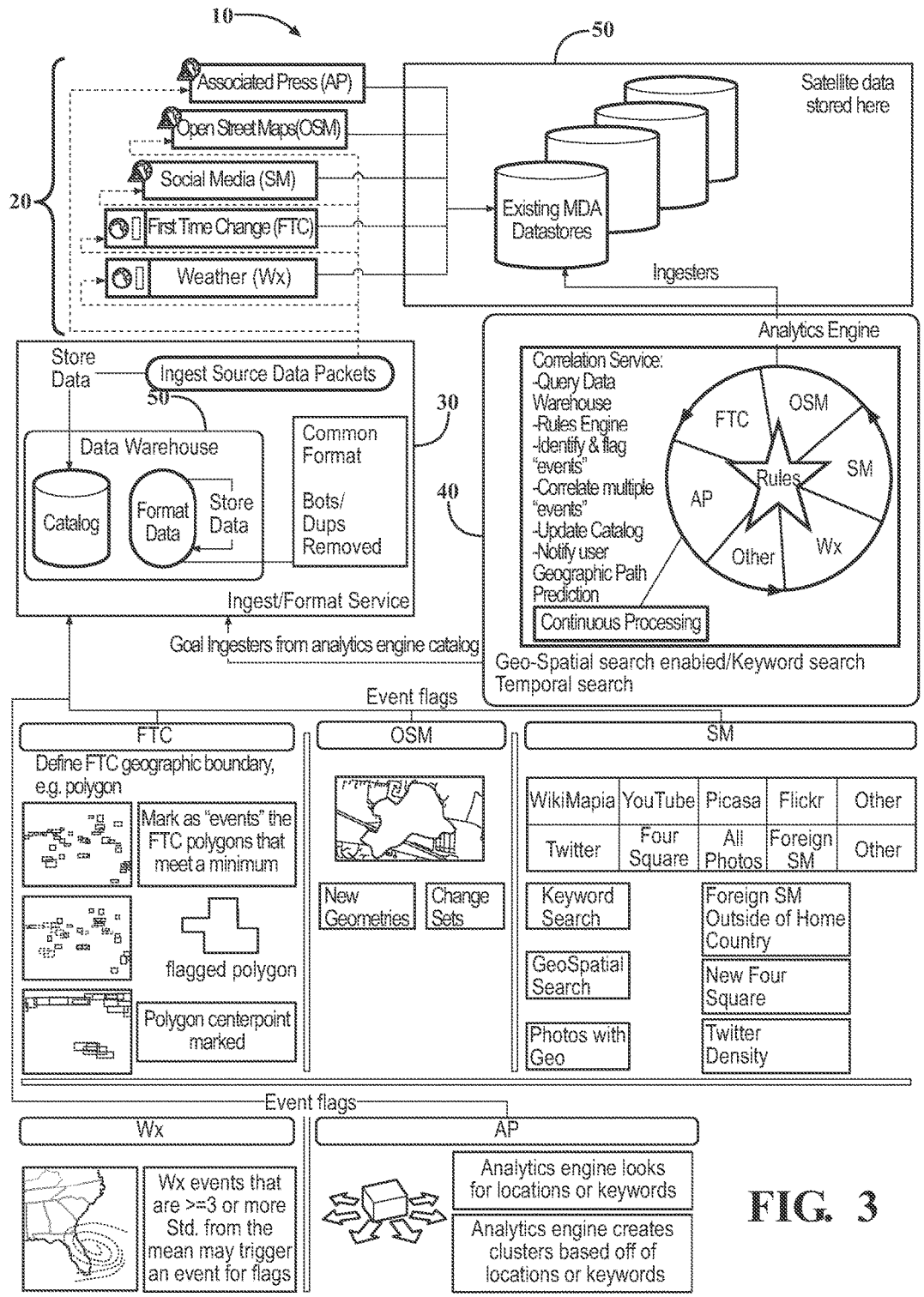
FIG. 3 is a second embodiment of a MARI system for identifying, querying and reporting geographic areas and nongeographic features to a user for human analysis.

Analytics engine 40 may be programmed with processing rules. Applying the processing rules, analytics engine 40 may flag and correlate ADPs, FTCs and other current and historical data substantially continually. Analytics engine 40 may also update the catalog and data warehouse 50 to record and store flagged and correlated events. The rules governing these processes may comprise pre-programmed rules that are not readily altered by a user, comprise pre-programmed rules that are readily modifiable by a user, and comprise rules that are user-generated. For example, analytics engine 40 may comprise pre-programmed rules that flag new geometries for updated OSM delta datasets. It may comprise rules that flag FTCs of a presumed minimum geographic size which size may be changed by a user. Analytics engine 40 may look for locations and keywords in ADPs, including in newswire stories (as shown in FIG. 3 near bottom) and also in social media, and may create clusters based off of locations or keywords.

The analytics engine 40 may accept geographic search queries from a user, keyword search queries from the user, and temporal inquiries. In one embodiment, the rules may comprise specific geographic, keyword or temporal queries to the analytics engine 40, which may be in Boolean search form, or an equivalent search extracted by a natural language processor, or a search performed by utilizing dropdown boxes or radio buttons on a user interface, or any equivalent or combination of the foregoing. For example, a rule could be fashioned from the user query "geographic location (Ukraine) and keyword (airport) and time (June 2016)." Geographic location queries may be directed to areas of interest arising as a result of the MARI system's currently operating flagging and correlating steps, e.g. "What are the current AOIs in southeast Asia?" In another embodiment, the rules may include functionality that correlates a geographic AOI with to a feature associated with that location, e.g. "Kremlin" for "Moscow, Russia." In another embodiment, geographic location queries may comprise named areas of interest (NAIs), e.g. "What are current flagged items for Manila?" or "Are there any new correlated asynchronous events in Lebanon?" Further, analytics engine 40 may include the ability to processes variants and/or synonyms of a queried location or keyword according to techniques known in the art. In another embodiment, a user could fashion a geographic query by drawing a box (or circle, etc.) on an interactive map in communication with analytics engine 40, such as a user interface 70 discussed further below.

The rules may also comprise rules that the system may generate itself. For example, if the analytics engine 40 records an earth disturbance exceeding "6" on the Richter magnitude scale, and simultaneously flags and correlates thousands of ADPs in the same geographic location, it could auto-generate a rule to allocate more of the engine's computing capacity for that geographic area and related events.

In another embodiment, analytics engine 40 flags one or more ADPs as an area of interest (AOI). In another embodiment, analytics engine 40 flags one or more ADPs as a person of interest. In another embodiment, analytics engine 40 flags one or more ADPs as a feature of interest. In another embodiment, analytics engine 40 tallies flagged ADPs within an AOI. In another embodiment, analytics engine 40 tallies flagged ADPs within a named area of interest (NAI). In another embodiment, the processing rules comprise identifying daily data volume deltas for cell tower locations. In another embodiment, the processing rules comprise identifying cell tower usage volumes that deviate significantly from the historical mean.

In addition to qualifying, correlating and flagging ADPs and FTCs, analytics engine 40 may catalog and store data. In one embodiment, depicted in FIG. 1, the cataloging step is performed by analytics engine 40 and the storing step is performed at a separate data warehouse 50. In other embodiments shown in FIGS. 2-5, data warehouse 50 is depicted as a subcomponent of analytics engine 40. Data warehouse 50 stores catalog data relating to data sources 20, as cataloged by analytics engine 40. Analytics engine 40 catalogs FTC events, asynchronous data events, and ADPs in data warehouse 50, which step comprises associating a qualified ADP, etc. with a geographic area, feature of interest, person of interest, event, time, etc. Data warehouse 50 stores cleaned and formatted ADPs, flagged ADPs and FTCs, asynchronous data events and FTC events.

As shown in FIG. 1, data warehouse 50 may receive data directly from any of the data sources 20, or from ingest service 30, or from analytics engine 40, or from any combination of the foregoing. Data warehouse 50 may be comprised of a plurality of storage locations, and may be segregated into data relating to current events/information and historical events/information. In one embodiment, ADPs, events, imagery, and correlationships are stored in at least one data warehouse and which comprises a relational database. In another embodiment, the relational database supports geographic objects, such as enabled by PostgreSQL software. In another embodiment, the relational database comprises a PostGIS extension to the PostgreSQL software. (GIS refers to geographic information system). In another embodiment, the data warehouse comprises a tactical database relating a tactical area of interest prescribed by a user. In another embodiment, the data warehouse comprises an archive database. In another embodiment, the data warehouse comprises internet cloud-based storage. The internet cloud-based storage may be provided by a third party service such as Amazon Web Services S3, Redshift, or Snowflake. In another embodiment, the data warehouse may comprises an imagery cache and an imagery datastore.

As noted above, the rules governing the analytics engine 40 may comprise rules relating to qualification, correlation, flagging, and cataloging. The rules may further provide for performing a correlation step in party by submitting a query to data warehouse 50 comprising criteria for flagging an asynchronous data event. Analytics engine 40 may update the catalog to reflect correlated events. The flagging, correlation, and/or cataloging processes may run continually, for example flagging new geometries every time analytics engine 40 receives an updated OSM delta dataset. The processing rules may comprise identifying daily data volume deltas for cell tower locations, and may further comprise rules that flag geographic areas exhibiting higher than normal cell tower data volumes.

As shown in FIGS. 1 and 2, analytics engine 40 is also in communication with analyst service 60 which in turn is in communication with user interface 70 (as shown in FIG. 1) or in another embodiment analyst service 60 contains user interface 70 as a subcomponent (as shown in FIG. 2). In the embodiment described below, analyst service 60 comprises user interface 70 as a subcomponent as depicted in FIG. 2; however, those skilled in the art will appreciate that user interface 70 could be operated from a separate network-connected platform.

Analyst service 60 may comprise scores or even hundreds of features facilitating the communication and management of information between the user, analytics engine 40, and data warehouse 50. Regarding user queries, analyst service 60 may comprise user data queries including temporal, geographic location, events, AOIs, NAIs, persons of interest, features of interest, and topical or tactical points of interest, e.g. "explosion" or "Zika virus." As alluded to above, analyst service 60 may accept and communicate to analytics engine 40 user-generated rules, such as rules identifying named geographic areas of interest (NAIs), topics or other features of interest, or correlationships to be flagged for human review, e.g. "fire and Venezuela." Analyst service 60 may also comprise user inputs to manage (add, delete, update, prioritize, or modify) any or all of the engine rules already described, such as criteria for flagging ADPs, correlating asynchronous and FTC events based on NAIs or user-specified features of interest. The user may compose, modify, delete etc. rules via means well-known those in the art such as a graphical user interface. The system may also be programmed to generate rules automatically, for example based on the prevalence of newly flagged ADPs, or correlations determined in the correlating step. Analyst service 60 may also comprise features enabling the user to assess the output quality and/or performance of analytics engine 40, e.g. "need to narrow criteria relating to Ukraine airports."

Analyst service 60 may further comprise production of notifications, reports and/or metrics that are understandable to a human user. The notifications, reports, etc. can be tailored to user preferences in ways readily appreciated by those skilled in the art. In one embodiment, analyst service 60 comprises a geographic map view facilitating targeted reports and targeted query composition. In one embodiment, analyst service 60 stores geographic boundaries of an AOI or a NAI, and may comprise using GIS for geographic mapping, spatial analysis and processing, including analysis and targeting of areas for satellite image acquisition. Analyst service 60 may include providing a user with a base map on which to store geographic boundaries for AOIs or NAIs. Analyst service 60 may further comprise, for example, reporting the number of tallied correlations for an FTC and AOI, correlations for a certain class of ADPs and NAI, for an AOI and person of interest, etc. all in any number or combination in text, graphic, tabular, or manipulable formats. Analyst system 60 may send notification to users and/or administrators of recently flagged items, of recently correlated items, or an emerging event or issue identified by analytics engine 40.

Analytics engine 40 may correlate an FTC event detected by satellite imagery with one or more ingested ADPs or asynchronous data events, such as new geographic boundaries revealed by OSM delta data. Analytics engine 40 may correlate any number of flagged and/or correlated ADPs with one another or with one or more historical events, and may flag correlationships as a potentially important emerging event. Analytics engine 40 may then predict a geographic path of an event, useful for directing further satellite imagery acquisition or other intelligence efforts.

For example, a qualified FTC event may indicate construction activity in a city near a known military installation. Geotagged social media activity may indicate that commuters are experiencing long delays in a remote section of the same city. OSM delta data may confirm presence of a new service road to an airport in that city. Analytics engine 40 qualifies the social media ADP and correlates it with the OSM delta data and correlates the FTC event (the construction activity near the military installation) with the geotagged social media ADP, and perhaps correlates this activity with other asynchronous data sources 22 such as newswire services. Analytics engine 40 then predicts a likely geographic location for future activity of interest. This likely geographic progression is sometimes termed "left of look" by those skilled in the art. In this example, the recommended geographic coordinates might be geographic coordinates of the likely path of the service road and nearby structures. Analyst service 60 generates a notification and report including a recommended left-of-look coordinates for future satellite imagery acquisition by satellite. Analyst service 60 communicates the notification and report to satellite control 80 which directs a satellite to direct its imaging resources at the recommended geographic coordinates. In another embodiment, analyst service 60 communicates the left-of-look notification and report to a human analyst who determines whether to execute the satellite image acquisition at the recommended geographic coordinates. In another embodiment, the human analyst or his/her client entity may use the left-of-look notification and report to intensify other kinds of intelligence gathering efforts at the recommended coordinates, such as by increasing collection and processing efforts of ADPs in or near the recommended geographic coordinates, increasing the computing capacity of analytics engine 60 concerning ADPs correlated with the recommended coordinates, prioritizing collection of asynchronous data from the coordinates, or directing human intelligence assets to intensify efforts at gaining intelligence in the proximity of the recommended coordinates. The predicted geographic progression may relate to an AOI or a NAI, or to geographic coordinates associated with a person of interest or a feature of interest.

Analyst service 60 may further comprise a screen for recording remarks by the user as well as a screen to query system data. The screen for querying system data may comprise a pull-down menu for querying system data, a picklist, a checkbox, or capability for formulating SQL queries. Analyst service 60 may further comprise a time span selector, wherein the time span selector comprises any potentially relevant time range, e.g. the last 30 minutes, the last six hours, the last 24 hours, the last week. The time span selector may be preset or may comprise a user-defined time range.

Analyst service 60 may provide the user, via user interface 70, a choices of which asynchronous data sources to query (e.g. only news reports, or only weather). Analyst service 60 may comprise a selection option for viewing only qualified ADPs, for viewing flagged ADPs, and/or for narrowing queries based on input for any attributes associated with an ADP. Additionally, analyst service 60 may comprise a record review indicator which allows a user to override flags or qualification grades assigned to an ADP by analytics engine 40. Analyst service 60 may generating a report for transmittal to the user, wherein the generated reports is delivered to a user or any authorized administrator or other recipient via email, wherein the generated report is delivered via a network (e.g. an intranet or internet), file transfer protocol, or other means well known to those skilled in the art. The report may be delivered on demand or to a user periodically via analyst service 60. The service may provide reports to a user or administrator depicting user activity organized by project in the form of a table, a chart, or a graph.

Analyst service 60 may comprise a step of stamping a user's query with the identity of the user as well as with the time of the user's query, and likewise stamping a user's review of an event or report with the identity of the reviewing user and the time of the event review. Analyst service 60 may further comprises a means for facilitating future analysis, for example saving search queries for future access by the user, or saving preferred map views or interface views. Analyst Service 60 may further comprise a mechanism for verifying a user's access credentials, a mechanism for identifying or defining a user project, e.g. "Kazakhstan highway construction."

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

What is claimed is:

1. A computer-implemented method of identifying areas for satellite imagery acquisition comprising:
    detecting a persistent first time change (FTC) at a geographic location by comparing two or more satellite images of the geographic location at two or more points in time;
    defining a geographic boundary of the FTC;
    marking as an "FTC event" if the geographically bounded FTC exceeds an area threshold;
    collecting asynchronous data from a plurality of data sources, each data source comprising a plurality of geotagged and timestamped asynchronous data packets (ADPs), wherein the ADPs comprise social media postings, weather conditions at a weather location, newswire stories, and Open Street Maps (OSM) maps;
    qualifying an ADP by assessing that ADP for reliability and authenticity;
    designating one or more qualified ADPs as an "asynchronous data event;" correlating the FTC event and the qualified asynchronous data event;
    predicting a geographic progression of the correlated events; and
    identifying a target geographic location for future satellite imagery acquisition based on the predicted geographic progression.

2. The method of claim 1, further comprising the step of flagging an ADP as potentially relevant to a geographic area of interest (AOI).

3. The method of claim 2, further comprising the step of ascertaining the flagged ADP's geographic location from its geotag and comparing geographic locations of the flagged ADP and the AOI.

4. The method of claim 1 further comprising the steps of storing and cataloging in a data warehouse the qualified ADPs, the FTC event, and the asynchronous data event.

5. The method of claim 4, further comprising a historical asynchronous data event that is stored and cataloged in the data warehouse.

6. The method of claim 4 wherein the correlating step utilizes an analytics engine employing a plurality of rules.

7. The method of claim 6 further comprising the step of flagging an ADP as potentially responsive to one or more rules.

8. The method of claim 6 wherein the rules comprise a geographic location query.

9. The method of claim 6 wherein the rules comprise rules auto-generated by the analytics engine.

10. The method of claim 6 wherein the rules comprise flagging a deviant weather condition because the weather condition exceeds a preset number of standard deviations from the norm for the time and place of the weather condition.

11. The method of claim 6 wherein the rules comprise flagging a deviant seismic condition because the seismic condition exceeds a preset magnitude of earth disturbance on the Richter scale.

12. The method of claim 6 wherein the asynchronous data sources further comprise text messages transmitted via at least one cell tower.

13. The method of claim 12 wherein the rules comprise flagging a deviant text volume condition because text volume exceeds a preset number of standard deviations from the norm for the at least one cell tower.

14. The method of claim 6, further comprising a step of notifying a user of correlated events via an analyst service.

15. The method of claim 14, further comprising a step of communicating at least one cataloged ADP to the user via the analyst service.

16. The method of claim 14, further comprising a step substantially contemporaneous with the collecting step of ingesting an ADP into an ingest service for preprocessing.

17. The method of claim 16 further comprising an extracting step to extract unstructured data from the ingested ADP.

18. The method of claim 6 wherein the correlating step comprises correlating asynchronous data events based on a user-specified interest.

19. A system for identifying geographic areas for satellite imagery acquisition comprising:
    a satellite imagery source, the satellite imagery source comprising images indicating a persistent First Time Change (FTC) of a first geographic location;
    a plurality of asynchronous data sources, the asynchronous data sources comprising social media postings, a continual newswire feed, Open Street Maps data, weather conditions, cell tower usage data, and a seismic disturbance feed;
    a social media ingest service, wherein the ingest service de-dupes, de-bots, and renders social media postings into a common format for processing;
    an analytics engine that receives data from the satellite imagery source and from one or more of the asynchronous data sources, wherein the analytics engine comprises a computer processor governed by processing rules that qualify, flag, correlate and catalog a portion of the received data;
    a data warehouse in communication with said analytics engine, wherein said data warehouse comprises at least one relational database, said data warehouse storing the data cataloged by the analytics engine in one or more memories;
    an analyst service in communication with said analytics engine and in communication with said data warehouse, wherein said analyst system accepts queries from a human user concerning the first geographic location via a user interface, said analyst system transmitting the query to said data warehouse and to said analytics engine;
a report generated by the analyst service and delivered to the user, said report comprising 1) qualified and flagged asynchronous data that correlates with the FTC of the first geographic location and 2) coordinates for a second geographic location associated with said qualified and flagged asynchronous data; and
a satellite controller that directs the satellite imagery source to acquire at least one image of the second geographic area.

* * * * *